July 15, 1952 E. E. MASTERSON 2,603,722

ELECTRONIC PHONOGRAPH PICKUP

Filed March 31, 1949

INVENTOR
EARL E MASTERSON
BY Morris A. Rahe[illegible]
ATTORNEY

UNITED STATES PATENT OFFICE 2,603,722

ELECTRONIC PHONOGRAPH PICKUP

Earl E. Masterson, Palmyra, N. J., assignor to Radio Corporation of America, a corporation of Delaware Application March 31, 1949, Serial No. 84,633

10 Claims. (Cl. 179—100.41)

Figure 1:
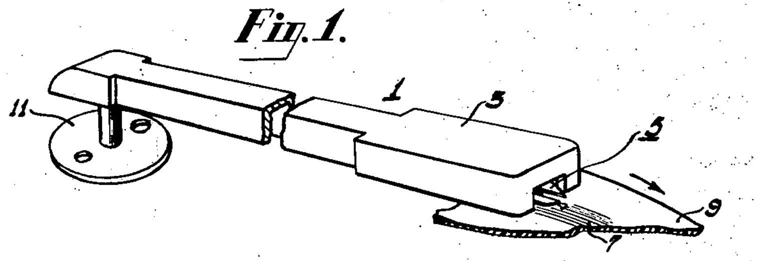

My present invention relates to electronic transducers and more particularly to transducers suitable for reproduction of sound from a phonograph record.

Among the many types of electronic transducers of pick-ups are those which employ an evacuated tube or shell having two or more electrodes therein, one of which is movable with respect to the other or others and has a phonograph needle coupled thereto. In this type of pick-up, when the needle or stylus is actuated by the signal groove of a phonograph record, the coupling means between the needle and the movable electrode transmits the vibratory movement to the movable electrode and produces variations in current corresponding to the recorded signals, in the output circuit of the tube. For a more detailed description of this type of pick-up, reference is made to the copending application of Harry F. Olson, Serial No. 706,967, filed October 31, 1946, now Patent No. 2,491,390.

Irrespective of the advantages claimed for pick-ups of the electronic type, it may be said, generally, that difficulties are frequently encountered in achieving a response characteristic which is uniform throughout the useful range of audio frequencies. In order to overcome this difficulty and to construct an efficient pick-up having a satisfactorily uniform frequency response characteristic, the vibratory system of the pick-up must meet several specific requirements: such as (1) low mechanical impedance, (2) freedom from objectionable mechanical resonances at frequencies in the audio range, and (3) in the case of a vibratory system of a pick-up for use with lateral cut records, the system should possess sufficient vertical compliance to allow for any vertical components which may be the result of pinch effect, dirt particles in the record groove, or other record surface imperfections.

Accordingly, the principal object of my present invention is to provide an improved electronic transducer or pick-up, and one which shall possess the above-described desirable operating characteristics.

Another and specific object of my invention is to provide an improved electronic pick-up which shall have a low mechanical impedance to vibrations imparted by the sound groove of a phonograph record.

Another object of my invention is to provide an improved electronic pick-up which shall be suitable for use with lateral cut records, and one which shall exhibit (*a*) maximum freedom of lateral movement and (*b*) sufficient vertical compliance to allow for the vertical components encountered in lateral-cut records.

Still another object of my present invention is to provide a simple, inexpensive and trouble-free electronic pick-up which, in operation, shall be substantially free from resonance peaks in its frequency response characteristic over an extended, useful audio range.

In accordance with my present invention, I provide an electronic transducer tube, which has a flexible diaphragm as part of its wall structure and two or more electrodes mounted therein, with a support or mount for attaching the tube to a pick-up arm of a phonograph so that the tube will be normally disposed with its longitudinal or major axis in a horizontal position. One of the electrodes is supported intermediate its ends in a horizontal position by the diaphragm and is movable with respect to the other electrode. A rigid, vertical yoke member is flexibly mounted across the face of the diaphragm external to the tube, and is also connected to the movable electrode adjacent the latter's connection to the diaphragm. The yoke being thus mounted may be said to provide a vertical pivot axis which will effectively prevent movement of the movable electrode in a vertical plane, but will permit freedom of movement laterally. A stylus arm having a record engaging tip at one end thereof, has its opposite end connected to the lower end of the yoke, and is disposed substantially parallel to the tube axis. The stylus is elongated and of rectangular cross section with the major faces thereof disposed in a horizontal plane so that the stylus has a high degree of flexibility in a vertical direction and is rigid laterally, thereby insuring transmission of substantially only lateral motion imparted to the stylus by a lateral cut record. In order to reduce mechanical resonance at certain frequencies a damping member is attached adjacent the end of the movable electrode externally of the tube.

Figure 2:
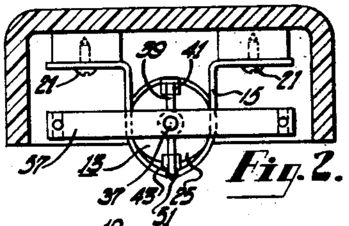
Figure 3:
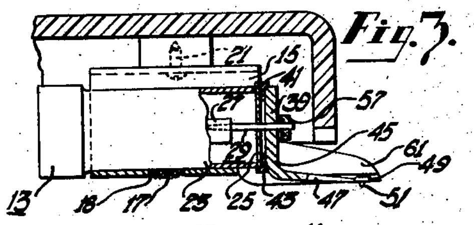
Figure 4:
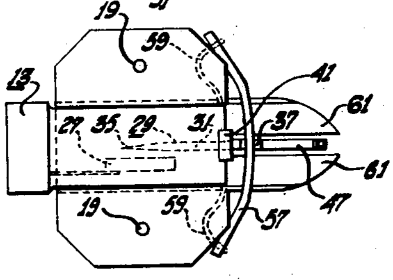
Figure 5:
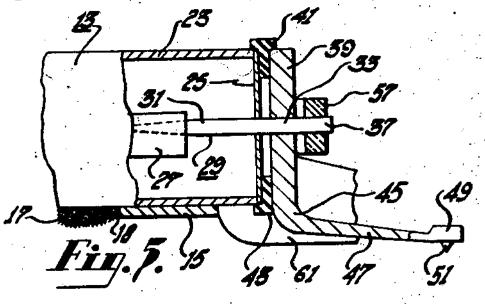
Figure 6:
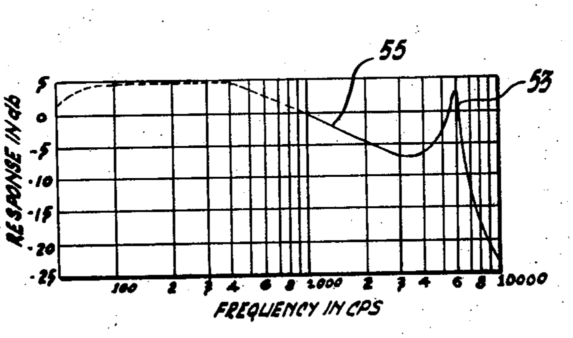
Figure 7:
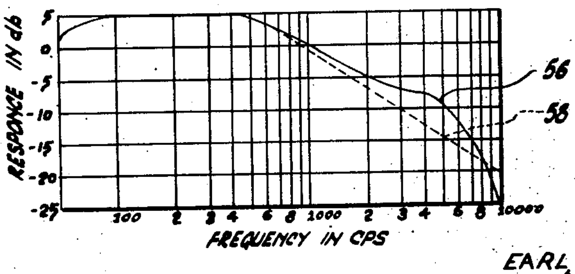

The novel features of my invention, as well as additional objects and advantages thereof, will be better understood from the following detailed description when read in connection with the accompanying drawing, in which Figure 1 is a perspective view of a phonograph pick-up device provided with a pick-up in accordance with my invention, and showing the device in its normal operating position with respect to the grooved area of a phonograph record, Figure 2 is an enlarged, end view of the pickup device shown in Figure 1, with the pick-up arm shown in section, Figure 3 is a side, central section of a portion of the pick-up device shown in Figure 1, with the transducer tube and stylus shown partly in elevation, Figure 4 is a plan view of the pick-up and pick-up mount of Figures 2 and 3, Figure 5 is an enlarged view of a portion of the pick-up and pick-up mount shown in Figure 3, Figure 6 is a curve showing the frequency response characteristic of a pick-up, in accordance with my invention, without damping, and Figure 7 is a similar curve with the solid line curve showing the damped response characteristic, and the dotted line curve showing the true amplitude response characteristic.

Referring more particularly to the drawing, wherein similar reference characters designate corresponding parts throughout, there is shown in Figure 1, a phonograph pick-up device 1 comprising a pick-up arm 3, on one end of which is attached an electronic transducer or pick-up 5 for cooperation with the grooved area 7 of a phonograph record 9. The opposite end of the pick-up arm is pivotally mounted upon a support 11 which is customarily attached to the motor board of the phonograph, and permits the pick-up arm to be moved in horizontal and vertical planes.

The pick-up 5 comprises an electronic transducer tube 13 which is attached to a mount or suitable supporting member 15 by means of soldering 17 through an aperture 18 in the mount, or other suitable means. The mount 15 is provided with apertures 19 through which screws 21 may be inserted for attaching the pick-up 5 to the pick-up arm 3. With this arrangement, the tube 13 is mounted with its major axis normally disposed substantially parallel to the phonograph record 9, thus reducing the vertical dimensions of the pick-up 5 and the pick-up arm 3.

The electronic transducer tube 13, illustrated in Figures 2 through 5 of the drawing, is of the diode type. However, it may be of any other suitable type of multi-electrode tube for efficiently converting mechanical forces into electrical signals. The tube 13 comprises an evacuated, metal envelope or shell 23, the front end wall of which is a thin, metallic diaphragm 25. Within the shell is a cathode or fixed electrode 27, and an anode or movable electrode 29. The movable electrode 29 comprises an elongated rod or bar which extends through and is secured intermediate its ends to the flexible diaphragm 25 so that its length is disposed along the longitudinal or major axis of the tube. Thus the diaphragm 25 divides the movable electrode 29 into inner and outer portions 31, 33, the respective ends 35, 37 of which are freely movable so that the portions 31, 33 will be capable of rotating about the major axis of the tube 13 with the movable electrode's connection to the diaphragm functioning as a pivot. The inner portion 31 is supported in spaced relation to the cathode 27 and cooperates therewith in a manner well known in the art.

A rigid yoke 39 is mounted on small rubber blocks 41, 43, and is disposed in a vertical position across the outside face of the diaphragm 25, the rubber blocks being attached to the envelope or shell 23 adjacent to the periphery of the diaphragm. The rigid, vertical yoke 39 is also connected to the outer portion 33 of the movable electrode 29 adjacent to the latter's connection to the diaphragm 25. The rubber blocks 41, 43 provide spaced, vertical bearings for the yoke 39, and since the yoke is connected to the movable electrode 29 near the latter's center of rotation, the yoke functions as a vertical axis about which the movable electrode 29 may pivot. With this arrangement, the yoke 39 permits the movable electrode 29 to freely move in a lateral plane and restricts any movement in a vertical plane. Inasmuch as the transducer tube 13 becomes quite hot during operation, natural rubber is not recommended for the vertical bearing blocks 41, 43. However, material such as silicone rubber, which will withstand temperatures up to 500° F., is found to be satisfactory and preferred.

Extending forward from the lower end 45 of the yoke 39, substantially parallel with the major axis of the transducer tube 13, is an elongated, resilient stylus arm 47, preferably rectangular in cross section, and having its major faces disposed horizontally. The stylus arm is quite stiff laterally so that it will insure nearly 100 percent transmission of the lateral mechanical motion imparted thereto by the record. On the other hand, the stylus arm is also relatively thin vertically so that it will provide sufficient vertical compliance to allow for any vertical components encountered in lateral cut records, such as those resulting from pinch effect, dirt particles in the record groove, or other record surface imperfections. At the outer or free end 49 of the stylus arm 47, there is attached a permanent record engaging tip or stylus 51 which cooperates with the sound groove of a record in a manner well known in the art.

In the vibrating system of the pick-up device 1, the ends 35, 37 of the movable electrode 29, and the stylus arm 47, under normal operating conditions, will move at approximately full groove amplitude. In this event, sufficient inertia is present to produce a resonant peak 53 in the audio range, as shown in the frequency response curve 55 in Figure 6 of the drawing. This mechanical resonance not only interferes with providing a smooth response throughout the useful range of audio frequencies, but it may also cause excessive record wear. In order to eliminate this mechanical resonance, it is necessary to apply mechanical resistance or damping to the vibrating system. This is accomplished by attaching a strip of damping material 57, such as Viscaloid, adjacent to the outer free end 37 of the electrode 29, which will absorb the undesirable resonances and provide a smooth frequency response characteristic as shown by the solid line curve 56 in Figure 7 of the drawing. If true amplitude response were produced by the pick-up, the frequency above 800 cycles would drop approximately 6 db per octave, as shown by the dotted line curve 58 in Figure 7. However, due to the degree of mechanical damping of the resonant peak 53, the response is slightly higher than would be expected from the true amplitude condition. This is an advantage in that the required pick-up compensation falls somewhere between constant amplitude and constant velocity. In other words, the damped pick-up response is almost ideal and makes electrical frequency compensation unnecessary.

Inasmuch as the tube 13 becomes quite hot during operation, the Viscaloid damping strip 57 is attached at its ends to supporting arms or extensions 59 connected to the mount 15, and the center of the strip is attached to the electrode outer portion 33 adjacent the end 37. Thus, the strip is remotely located so that it will be relatively unaffected by the heat. It will, of course, be recognized by those persons skilled in the art that the degree of damping obtainable is easily adjusted by positioning the Viscaloid strip along the electrode outer portion 33. Thus, when it is positioned near the end 37 of the rod, it is farthest from the center of rotation and will provide the most damping. On the other hand, when it is near the vertical yoke, and consequently near the center of rotation, less damping is obtained.

For the purpose of protecting the stylus arm 47 from damage, the mount 15 is provided with extensions 61 located on opposite sides of the stylus arm and which extend beyond the free end 49 thereof, as best seen in Figures 3 and 4 of the drawing.

In operation, the pick-up arm 3 guides the pick-up 5 in its path across a phonograph record so that the stylus arm 47 is maintained substantially parallel with the record. The stylus tip 51, when engaged with a lateral cut record groove, will be moved from side to side in a horizontal plane as the record is rotated by the phonograph turntable. This lateral movement is transmitted to the movable electrode 29 of the transducer tube 13 by the stylus arm 47 and the connecting yoke 39, and consequently the anode or movable electrode 29 is caused to move in a corresponding horizontal plane, with the tube diaphragm 25 acting as a pivot. Thus, the movable electrode's inner portion 31 will move toward and away from the cathode 27, in accordance with the variations in the record sound groove. Inasmuch as current is flowing between the cathode 27 and anode 29, the aforesaid movement of the anode will cause variations in the flow of current, which will be transmitted to an amplifier in well-known manner. It will be noted that any movement of the stylus arm 47, and consequently any corresponding movement of the anode 29, in a vertical direction, due to vertical components in the record, will not only be prevented by the yoke limiting movement of the movable electrode to a horizontal plane, but will also be minimized by providing sufficient vertical compliance in the stylus arm itself.

The above-described pick-up will be found to operate quite satisfactorily at ½ ounce needle pressure, and due to the wide latitude of anode movement it will track high amplitude passages without distortion.

From the foregoing description, it will be apparent that I have provided an improved electronic transducer which has a low mechanical impedance to vibrations imparted by the sound groove of a phonograph record, one which exhibits maximum freedom of lateral movement and has sufficient vertical compliance to allow for vertical components, and one which is simple and inexpensive to construct and is substantially free of resonant peaks in its frequency response characteristic.

It will be recognized by those persons skilled in the art that other modifications and changes apart from the single, preferred embodiment of my invention illustrated and described herein will readily suggest themselves. Therefore, I desire that the particular form of my invention described herein shall be considered as illustrative and not as limiting.

I claim as my invention:

1. A phonograph pick-up comprising an electronic transducer tube having a flexible diaphragm as part of its wall structure and containing a plurality of electrodes, one of said electrodes comprising a stationary element and the other of said electrodes extending to the exterior of said tube and supported intermediate its ends by said diaphragm for movement with respect to said stationary electrode, a rigid yoke mounted on said tube in transverse spaced relation to said diaphragm and connected to the external portion of said movable electrode adjacent its connection to said diaphragm, and an arm having means adjacent to one end for supporting a stylus, said arm being connected adjacent to its other end to said yoke.

2. The invention as set forth in claim 1 wherein said rigid yoke is pivotally mounted on said tube and comprises a vertical axis about which said movable electrode and said arm may pivot.

3. The invention as set forth in claim 2 wherein said arm comprises an elongated flexible member of rectangular cross section having a major surface disposed in a plane substantially normal to said vertical axis.

4. The invention as set forth in claim 3, characterized by the addition of damping means connected to said movable electrode outer portion.

5. A phonograph pick-up device comprising in combination a support, an electronic transducer tube connected to said support with its longitudinal axis disposed horizontally, said tube comprising an evacuated envelope having a flexible diaphragm as part of its wall structure and a plurality of electrodes therein one of which is supported intermediate its ends by said diaphragm and is movable with respect to the other of said electrodes, said movable electrode extending generally along said tube axis and having inner and outer portions rotatable about said axis with said movable electrode's connection to said diaphragm as a pivot, means attached to said outer portion for restricting vertical movement of said movable electrode and for permitting freedom of movement horizontally, and a stylus arm connected to said means and having means providing a support for a stylus whereby vibratory movement imparted to said stylus will be transmitted to said movable electrode through said stylus arm and said first mentioned means.

6. The invention as set forth in claim 5 wherein said means for restricting movement of said movable electrode comprises a rigid yoke vertically disposed in spaced relation to said diaphragm and transversally thereof.

7. The invention as set forth in claim 6 wherein said tube includes flexible mounting means attached adjacent the periphery of said diaphragm at diametrically opposite points, and wherein said yoke is mounted on said flexible mounting means thereby to provide a vertical pivot axis for said movable electrode.

8. The invention as set forth in claim 7 wherein the lower end of said yoke extends beyond the periphery of said diaphragm, and wherein said stylus arm has one end connected to said lower yoke end and has means provided adjacent its opposite end for supporting said stylus.

9. The invention as set forth in claim 8 wherein said stylus arm comprises a flexible, elongated member mounted substantially parallel with said tube axis, and wherein said stylus arm is relatively thin vertically and wide horizontally to provide a greater degree of flexure vertically than horizontally.

10. The invention as set forth in claim 9 characterized by the addition of damping means connected to said movable electrode outer portion.

EARL E. MASTERSON.

REFERENCES CITED

The following references are of record in the file of this patent:

UNITED STATES PATENTS

| Number | Name | Date |
|---|---|---|
| 1,936,922 | Sukumlyn | Nov. 28, 1933 |

| Number | Name | Date |
|---|---|---|
| 2,417,712 | Snepvangers | Mar. 18, 1947 |
| 2,482,972 | Gordon | Sept. 27, 1949 |
| 2,491,391 | Rose | Dec. 13, 1949 |

OTHER REFERENCES

Vacuum Tube Type Transducer for Use in the Reproduction of Lateral Phonograph Recording, Proceedings of the Institute of Radio Engineers, vol. 35, No. 12, pages 1571–1575, December, 1947.

Vacuum Tube as Electro Mechanical Transducer, Tele-Tech Magazine, July 1947, pages 66 and 67.